United States Patent [19]

Hillrichs et al.

[11] Patent Number: 5,308,465
[45] Date of Patent: May 3, 1994

[54] MEMBRANE FOR A GAS DIFFUSION ELECTRODE, PROCESS OF MANUFACTURING THE MEMBRANE, AND GAS DIFFUSION ELECTRODE PROVIDED WITH THE MEMBRANE

[75] Inventors: Eilhard Hillrichs, Büdingen; Ulrich Sander, Friedrichsdorf, both of Fed. Rep. of Germany

[73] Assignee: Metallgesellschaft Aktiengesellschaft, Frankfurt am Main, Fed. Rep. of Germany

[21] Appl. No.: 986,275

[22] Filed: Dec. 7, 1992

[30] Foreign Application Priority Data

Dec. 12, 1991 [DE] Fed. Rep. of Germany ....... 4140972

[51] Int. Cl.$^5$ .............................................. C25B 11/00
[52] U.S. Cl. ................... 204/283; 204/290 R; 429/41; 429/40
[58] Field of Search ............ 204/283, 296, 290 R, 204/295; 429/30, 40, 41, 42; C25B 13/08, 11/04, 11/12, 11/00

[56] References Cited

U.S. PATENT DOCUMENTS

| | | | |
|---|---|---|---|
| 4,216,073 | 8/1980 | Goldstein | 204/301 |
| 4,293,396 | 10/1981 | Allen | 204/106 |
| 4,419,209 | 12/1983 | Klinkowski | 204/296 |
| 4,614,575 | 9/1986 | Juda | 204/265 |
| 4,647,359 | 3/1987 | Lindstrom | 204/294 |
| 5,203,978 | 4/1993 | Tsou et al. | 204/283 |

FOREIGN PATENT DOCUMENTS 0026995 8/1986 European Pat. Off.
0345864 5/1989 European Pat. Off.

Primary Examiner—Kathryn Gorgos
Attorney, Agent, or Firm—Herbert Dueno

[57] ABSTRACT

The membrane serves to cover a gas diffusion electrode on its outside surface facing a liquid electrolyte. The membrane is impermeable to gas and water-absorbent. It comprises a textile carrier layer. At least one gas-sealing layer, which contains ion exchange material and binder in a weight ratio from 10:1 to 1:2, is bonded to the textile carrier layer. In the manufacture of the membrane, an adhesive layer consisting of a binder in a solvent and subsequently at least one gas-sealing layer are applied to the textile carrier layer.

9 Claims, 1 Drawing Sheet

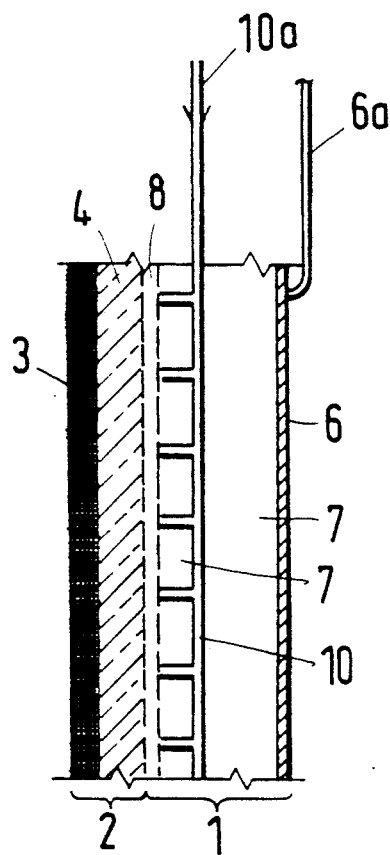

MEMBRANE FOR A GAS DIFFUSION ELECTRODE, PROCESS OF MANUFACTURING THE MEMBRANE, AND GAS DIFFUSION ELECTRODE PROVIDED WITH THE MEMBRANE

FIELD OF THE INVENTION

Our present invention relates to a membrane for covering a gas diffusion electrode on its outside surface facing a liquid electrolyte, which membrane is gas-impermeable and water-absorbent and comprises a textile carrier layer. The invention also relates to a process of manufacturing such a membrane and to a gas diffusion electrode provided with such a membrane.

BACKGROUND OF THE INVENTION

EP-A-0 345 864 describes a membrane for use in a gas diffusion electrode. That known membrane essentially consists of a textile carrier layer, which is impregnated with a polymer, which in water forms a hydrogel.

The polymer and the hydrogel do not have ion exchange properties. Details of the design and operation of gas diffusion electrodes have also been explained in U.S. Pat Nos. 4,293,396 and 4,614,575 and in European Patent 0 026 995.

OBJECTS OF THE INVENTION

It is an object of the invention to provide a membrane for a gas diffusion electrode which is stable and gas-tight during long-time use and also avoids an ingress of electrolyte into the interior of the gas diffusion electrode.

Another object of this invention is to provide an improved gas diffusion electrode which utilizes the unique membrane.

Still another object of the invention is to provide an improved method of making the membrane and an electrode provided therewith. This is accomplished in accordance with the invention in that at least one gas-sealing layer, which contains ion exchange material and binder in a weight ratio of 10:1 to 1:2, is bonded to the textile carrier layer.

SUMMARY OF THE INVENTION

In the manufacture of the membrane, an adhesive layer consisting of a binder in a solvent and subsequently at least one gas-sealing layer consisting of ion exchange material and binder in a weight ratio of 10:1 to 1:2 are applied to the textile carrier.

The gas diffusion electrode in accordance with the invention can be inserted into various electrolyzers and on its outside surface facing the electrolyte is already provided with the membrane described hereinbefore.

The ion exchange material of the gas-sealing layer may have cation exchange properties or anion exchange properties. Anodes are usually provided with membranes having cation exchange properties. Cathodes are mainly provided with membranes having anion exchange properties, cathodes may also be provided with membranes having cation exchange properties if an acid electrolyte is employed.

In the manufacture of the membranes, the cation exchange or anion exchange material may be selected, e.g. from the following materials. The cation exchange material preferably consists of a cross-linked polymer having active sulfonic acid or carboxyl groups. The anion exchange material preferably consists of a cross-linked polymer having active amine groups.

The commercially available materials are supplied as powders having particle sizes approximately in the range from 1 to 50 micrometers and are mixed with the binder as homogeneously as possible. Suitable binders include electrolyte-resisting polymers, such as polyvinylidene difluoride (PVDF), polyhydantoin (PHD) or polysulfone. The binder composition which is mixed with the ion exchange powder contains a liquid solvent or a diluent, such as dimethyl acetamide (DMA) or N-methyl pyrrolidone (NMP) or curable reactants, such as are used with epoxy resins. The initially liquid mixture may contain about 50 to 80% solvent by weight.

In the cured membrane, the weight ratio of ion exchange material to binder is in the range from 10:1 to 1:2 and preferably form 8:1 to 1:1. Curing is suitably effected at elevated temperatures in the range from 50° to 150° C.

The effectiveness of the gas-sealing layer of the membrane, particularly as regards its permeability to water, may be improved by the addition of carbon black or finely divided $SiO_2$. Relative to the cured binder, the preferred proportion of carbon black in the gas-sealing layer is about 1 to 20% by weight and the proportion of finely divided $SiO_2$ is about 0.5 to 7% by weight.

The stability of the gas-sealing layer can be increased by the addition thereto of polymer fibers or glass fibers. Such fibers will also impart a certain elasticity to the gas-sealing layer. The polymer fibers or glass fibers in the gas-sealing layer amount preferably to 0.1 to 5% by weight.

The textile carrier layer of the membrane may consist of woven or knitted or nonwoven fabrics. The filament or fiber material of the carrier layer may consist of polyester, polypropylene, polyphenylene sulfide, glass, carbon or metal.

BRIEF DESCRIPTION OF THE DRAWING

Additional possibilities which can be adopted in the design of the membrane and in its manufacture and in the design of the gas diffusion electrodes provided with such membranes will be explained with reference to the drawing. the sole Figure of which is a greatly enlarged fragmentary sectional view showing a part of a gas diffusion electrode.

SPECIFIC DESCRIPTION

The gas diffusion electrode consists of an electrode body 1 and the membrane 2, which is bonded to that body and is in contact with the liquid electrolyte. The main components of the membrane consists of the textile carrier layer 3 and the gas-sealing layer 4 which is bonded thereto.

The electrode body 1 comprises a current-distributing layer 6 which is provided with a terminal 6a for a supply of electric current, an electrically conductive core layer 7 and a gas-permeable catalyst layer 8. The core layer 7 contains a passage system 10 for distributing a gas, which is supplied from the outside through a line 10a and is distributed into the catalyst layer 8. The gas may consist of oxygen, air or hydrogen.

The textile carrier layer 3 can consist of a nonwoven fabric and usually has a thickness of 0.1 to 2 mm. The gas-sealing layer 4 contains ion exchange material and may alternatively be composed of a plurality of superimposed layers, which have consecutively been applied.

The gas-sealing layer 4 usually has a thickness in the range from 0.02 to 1 mm. The layer 4 is impermeable to gas and for this reason must be free of macropores but that layer must be able to absorb water. Besides, it is made of electrically nonconductive material.

Water molecules diffuse through the layers 3 and 4 to the catalyst layer 8. At the same time, the gas is conducted through the passage system 10 as far as to the catalyst layer 8.

In a gas diffusion anode, the gas, such as hydrogen, is oxidized to H ions in the catalyst layer 8 and the H ions then migrate through the membrane, which has cation exchange properties, into the adjoining electrolyte. When $O_2$ gas is being distributed in the passage system 10 in a gas diffusion cathode, hydroxide ions are formed with water on the catalyst layer 8 and migrate through the membrane, which has anion exchange properties, into the electrolyte.

The catalyst layer 8 may consist of a woven fabric of carbon fibers, which contains bonded carbon black particles. The carbon black particles may contain finely divided particles of platinum and/or ruthenium. Polytetrafluoroethylene may be used, e.g. as an adhesive for that purpose.

Such catalyst layers comprising carbon fiber cloths are known per se and have been described, e.g. in U.S. Pat. No. 4,293,396 and 4,647,359. Alternatively the catalyst layer 8 may consist only of a layer of adhesively bonded carbon black particles without a carbon cloth.

The core layer 7 consists of electrically conductive material, such as a cured mixture of carbon black particles and epoxy resin.

The current-distribution layer 6 may consist of a metal net or a metal plate, e.g. of lead or a corrosion-resistant stainless steel.

Gas diffusion electrodes can be used for numerous purposes. Only by way of example, reference is made here to the hydrogen diffusion anode used in the electrolytic production of zinc, nickel or iron. In the electrolytic production of zinc by means of an aluminum cathode, a cell voltage of only 1.6 volts will be required if a hydrogen diffusion anode is employed whereas a cell voltage of 3.3 volts is usually employed in case of a conventional anode. Oxygen diffusion cathodes may be used, e.g., for an oxidation of metal ions.

SPECIFIC EXAMPLE

The following examples are carried out on a laboratory scale.

EXAMPLE 1

Manufacture of a first membrane: 70 g cation exchange powder a polystrene ion exchanger with sulfonic acid groups K1481 (Bayer AG); 5 g carbon black and 25 g PHD are suspended in 233 g NMP as a solvent. The suspension is applied to a nonwoven fabric of polyphenylene sulfide (PPS) and is dried in a drying cabinet at 100° C. for 2 hours. The coating and drying operations are repeated once. The resulting membrane has a thickness of 50 to 60 micrometers.

The gas tightness of the membrane is tested in a standard test cell. Before the test, the membrane is wetted with sulfuric acid having a concentration of 20%. In the test, the membrane remains gas-tight under pressures up to 1.8 bars.

Provision of the adhesive bond between the first membrane and a carbon fiber cloth: The membrane provided with the gas-sealing layer of the membrane is applied to one side of a carbon fiber cloth, which on that side is coated with carbon black and a platinum catalyst.

The carbon fiber cloth has a thickness of 1.5 mm. A suspension of 70 g cation exchange powder K 1481, 5 g carbon black, and 25 g PHD in 200 g NMP is prepared as an adhesive. The adhesive is applied as a layer having a thickness of about 100 micrometers to the carbon fiber cloth on the side coated with carbon black. The first membrane is pressed onto the adhesive-coated side of the carbon fiber cloth and is dried at 100° C. for 6 hours in order to bond the gas-sealing layer of the membrane to the cured adhesive layer.

Manufacture of the hydrogen diffusion electrode: The composite layer consisting of the first membrane and the carbon fiber cloth is adhesively bonded to a lead plate, which has a thickness of 1 cm and an area of 11 cm×15 cm. The lead plate contains a passage system for distributing hydrogen into the adhesively bonded carbon fiber cloth, which is bonded to the lead plate and coated with the membrane. The lead plate is bonded to the carbon fiber cloth by a carbon-containing electrically conductive adhesive (made by Mavidon, Palm City, Fla., U.S.A.).

Electrochemical test: The hydrogen diffusion electrode which has been manufactured as described hereinbefore has an effective electrode surface area of 90 cm². The electrode is immersed into an electrolyte such as is used for the electrolytic production of zinc. The electrolyte comprises 20% by weight sulfuric acid and 50% by weight zinc (as zinc sulfate). An aluminum cathode is suspended to extend into the electrolyte at a distance of 2 cm from the hydrogen diffusion anode. Hydrogen is supplied to the anode at a rate of 0.1 liter per hour. In a currentless state and at a temperature of 40° C., a half-cell potential of 0.05 volt±0.01 volt is obtained relative to a standard hydrogen electrode. When a current of 3.6 amperes is turned on so that the anode is loaded with a current density of 400 amperes per m², a half-cell potential of 0.35 volt relative to a standard hydrogen electrode is obtained; this corresponds to a cell voltage of 1.3 volts. Under these conditions, the electrolysis on a laboratory scale is carried out for 1500 hours.

EXAMPLE 2

A second membrane is manufactured as follows: 233 g dimethyl acetamide (DMA) are used as a solvent, in which 70 g cation exchange powder K1481, 4 g carbon black, 1 g highly dispersed silica, and 25 g PVDF are suspended. In other respects the procedure is the same as with the first membrane. In the pressure test it is found that the membrane remains gastight under pressures up to 2.0 bars.

Making of the adhesive bond between the second membrane and the carbon fiber cloth: The gas-sealing layer of the membrane is adhesively bonded to the carbon fiber cloth as described in Example 1 for the first membrane. A difference therefrom resides in that the adhesive layer is applied to the carbon fiber cloth on the side coated with carbon black as a suspension of 70 g cation exchange power K1481, 5 g carbon black and 25 g PVDF (Dyflor 2000 from Hüls AG) in 200 g DMA. A thin nonwoven fabric of glass fibers (Microlith SAB 0.25 of Schuler GmbH, Wertheim) is rolled into the adhesive layer before the latter is cured. When the adhesive layer which contains the nonwoven fabric of glass fibers has been cured, it has a thickness of 0.2 to 0.25 mm. The second membrane provided with the gas-sealing layer is pressed with the gas-sealing layer on the carbon fiber cloth and after drying at 100° C. for 6 hours a strong composite is obtained.

The electrode is manufactured as in Example 1. The electrode comprising the second membrane differs from the electrode provided with the first membrane only during an operation with a current of 3.6 amperes (corresponding to 400 amperes per m$^2$: A half-cell potential of 0.55 volt is measured against the standard hydrogen electrode; this corresponds to a cell voltage of 1.5 volts. The electrochemical test described in Example 1 is successfully carried out for an operating time of more than 4000 hours.

We claim:

1. A gas diffusion electrode for use in an electrolyzer containing a liquid electrolyte, said electrode comprising an electrode body of an electrically conductive material and a water-absorptive membrane facing said liquid electrolyte and in contact therewith, said body being provided with passages for a gas, said passages being connected to a supply line for feeding said gas into said passages, said electrode body comprising a gas-permeable catalyst-layer, said membrane comprising a textile carrier layer and at least one gas-impermeable gas-sealing layer, said carrier layer being bonded to said gas-sealing layer, said gas-sealing layer being bonded to said catalyst layer, said gas-sealing layer containing an ion exchange material and a binder in a weight ratio of 10:1 to 1:2.

2. The gas diffusion electrode defined in claim 1 wherein said body is an electrically conductive carbon-containing layer.

3. The gas diffusion electrode defined in claim 2 wherein said carbon-containing layer is a carbon fiber cloth.

4. The gas diffusion electrode defined in claim 3 wherein said ion exchange material is a cation exchanger.

5. The gas diffusion electrode defined in claim 3 wherein said ion exchange material is an anion exchanger.

6. The gas diffusion electrode defined in claim 3 wherein said binder consists essentially of at least one of the substances selected from the group which consists of polyvinylidene fluoride, polyhydantoin and polysulfone.

7. The gas diffusion electrode defined in claim 6 wherein said binder contains 0.5 to 7% by weight finely divided $SiO_2$ or 1 to 20% by weight carbon black or a mixture thereof.

8. The gas diffusion electrode defined in claim 7 wherein said gas-sealing layer contains polymer fibers or glass fibers.

9. The gas diffusion electrode defined in claim 8 wherein said textile carrier layer consists of a nonwoven fabric.

* * * * *